(12) United States Patent
Xue

(10) Patent No.: US 9,127,951 B2
(45) Date of Patent: Sep. 8, 2015

(54) INTERACTIVE DYNAMIC CLOUD NAVIGATION SYSTEM

(71) Applicant: Junhua Xue, Jiangsu (CN)

(72) Inventor: Junhua Xue, Jiangsu (CN)

(*) Notice: Subject to any disclaimer, the term of this patent is extended or adjusted under 35 U.S.C. 154(b) by 33 days.

(21) Appl. No.: 13/960,301

(22) Filed: Aug. 6, 2013

(65) Prior Publication Data

US 2014/0350841 A1 Nov. 27, 2014

(30) Foreign Application Priority Data

May 24, 2013 (CN) .......................... 2013 1 0200531

(51) Int. Cl.
*G01C 21/30* (2006.01)
*G01C 21/26* (2006.01)

(52) U.S. Cl.
CPC ...................................... *G01C 21/26* (2013.01)

(58) Field of Classification Search
CPC ........ G01C 21/26; G01C 21/32; G01C 21/20; G01C 21/28; G09B 29/106
USPC .................. 701/400, 409, 431; 455/422.1
See application file for complete search history.

(56) References Cited

U.S. PATENT DOCUMENTS

| 6,278,939 | B1* | 8/2001 | Robare et al. ................. 701/431 |
| 2007/0118281 | A1* | 5/2007 | Adam et al. .................. 701/211 |
| 2008/0208451 | A1* | 8/2008 | Minami ......................... 701/201 |
| 2010/0273470 | A1* | 10/2010 | Quimby et al. ............ 455/422.1 |
| 2011/0063132 | A1* | 3/2011 | Trum ......................... 340/932.2 |
| 2012/0103306 | A1* | 5/2012 | Livshits et al. ............... 123/429 |

* cited by examiner

*Primary Examiner* — Helal A Algahaim
*Assistant Examiner* — Shardul Patel

(57) ABSTRACT

An interactive dynamic cloud navigation system includes a server including a database having a map; and a plurality of navigation terminals, wherein each navigation terminal includes a data collecting and storing module, a data transmitting module and an outputting module. The data collecting and storing module includes a GPS chip. The data transmitting module is for transmitting data between the navigation terminal and the server. The data includes geographic positions of the navigation terminal and map data correspondent to the geographic positions. The server is for initiating a mission according to a request from at least one user, so as to provide personalized and customized data service.

10 Claims, 7 Drawing Sheets

INTERACTIVE DYNAMIC CLOUD NAVIGATION SYSTEM

BACKGROUND OF THE PRESENT INVENTION

1. Field of Invention

The present invention relates to a cloud navigation system, and more particularly to an interactive dynamic cloud navigation system where users and a system operator both participate in updating and examining data.

2. Description of Related Arts

A conventional map application generally comprises important information from a road system to street views, wherein the data is updated basically via firstly an application from a user, then an examination by a map operator or a business cooperator and accordingly a periodical data update on a map platform. Because of the examination, a speed of such data update of the map and a further downward extension of the map data are greatly restricted. If the map platform has the data extending downwardly, a number of the data surely increases geometrically. The conventional examination and updating manner fail to satisfy a requirement of further development of the map.

Besides, a few crowdsourcing maps emerge on the market, wherein users are able to freely update the map data with information, such as the information from GPS navigators of the users. Although the crowdsourcing maps overcome a slow speed of updating and a lack of abundance of the map data, the data thereof have poor accuracy because the data are changed casually and the examination lacks strictness.

Meanwhile, the above two types of maps generate data in identical manners that the map data are generated before needs of the users are provided. An interaction between the map data platform and the users remains to be thoroughly satisfied.

Thus, it is very necessary to provide an interactive dynamic cloud navigation system where data are updated according to user needs and users and a system operator both participate in examining the data, so as to maintain accuracy of the map data and accomplish good interaction between the users and the map data platform.

SUMMARY OF THE PRESENT INVENTION

An object of the present invention is to provide an interactive dynamic cloud navigation system which collects data according to user needs and executes self-improvement, wherein, when a need of a user is obtained, a server assigns a mission to other users or other users voluntarily respond to a mission to provide correspondent data, so as to accomplish high personalization and high customization.

Another object of the present invention is to provide an interactive dynamic cloud navigation system where users and a system operator both participate in updating and examining data, wherein mission affiliates are able to accept a mission of examination and provide data as feedback; and the system operator is able to examine the data.

Another object of the present invention is to provide an interactive dynamic cloud navigation system having interaction and sharing between users and a server, between the users and a system operator and among the users, wherein each user corresponds to an account.

Another object of the present invention is to provide an interactive dynamic cloud navigation system which updates map data in real time.

Accordingly, in order to accomplish the above objects, the present invention provides an interactive dynamic cloud navigation system comprising:

a server, comprising a database having a map; and a plurality of navigation terminals, wherein each navigation terminal comprises a data collecting and storing module, a data transmitting module and an outputting module, wherein the data collecting and storing module comprises a GPS chip; the data collecting and storing module is for collecting and storing data; the data transmitting module is for transmitting the data between the navigation terminal and the server; the outputting terminal is for outputting the data stored in the navigation terminal; each navigation terminal corresponds to an account; and the data comprise geographic locations of the navigation terminal and map data correspondent to the geographic locations;

wherein the server is for initiating a mission according to a request from at least one user; the navigation terminal logs in to the correspondent account, accepts the mission via the data transmitting module, responds to and executes the mission via the data collecting and storing module to generate the data and uploads the data to the server via the account, so as to finish the mission.

The navigation terminal is also for initiating the mission via the account and transmitting the mission to the server via the data transmitting module; the server responds to the mission, establishes a sub-mission and transmits the sub-mission to other accounts. Other navigation terminals log in to the other accounts, accept the sub-mission via the respective data transmitting modules, respond to and execute the sub-mission via the data collecting and storing module to generate sub-data and upload the sub-data to the server via the other accounts, so as to finish the sub-mission.

Preferably, the interactive dynamic cloud navigation system further comprises associate terminals for logging in to the accounts by the users to submit the data directly; the server examines the submitted data via computing and analyzing, so as to update the database of the server.

By the above structure, the interactive dynamic cloud navigation system is able to collect the data according to needs of the users, execute self-improvement and provide personalized and customized service.

When the account submits the data directly, the server gives credits to the account; when the navigation terminal uploads the data voluntarily or for finishing the mission or the sub-mission, the server gives credits to the account correspondent to the navigation terminal; and when the user initiates the mission via the account, the account consumes a certain number of credits.

By the above structure, the interactive dynamic cloud navigation system is able to accomplish and encourage interaction and sharing between the users and the navigation system and among the users.

The updating of the database by the server comprises following four types of updating having gradually decreased importance.

(1) Through the navigation terminal or the associate terminal, the user submits an application comprising revising, adding and deleting important information to the server, such as a transportation trunk, important landmark names and highly divergent information; the server initiates a mission of examination and randomly assigns the mission of examination to mission affiliates; the mission affiliates accept and finish the mission and become examination users; according to feedback data from the examination users, a system operator executes examining; after the data pass the examination, the server updates the database; and the user who submits the application and the examination users respectively obtain correspondent credits.

(2) Through the navigation terminal or the associate terminal, the user submits an application comprising revising, adding and deleting general map information to the server, such as general roads, general landmarks and road warnings; the server initiates a mission of examination and randomly assigns the mission of examination to mission affiliates; the mission affiliates accept and finish the mission and become examination users; according to feedback data from the examination users, the server decides whether to update the database or not; and the user who submits the application and the examination users respectively obtain correspondent credits.

(3) Through the navigation terminal or the associate terminal, the user submits an application comprising editing, designing and expanding specialized functions or special paths based on the current database without revising the current database to the server; the server updates the data of the database except the map data; and the server gives credits to the user who submits the application according to usage and evaluation of content of the application.

(4) The data collecting and storing module of the navigation terminal automatically collects data of surroundings, such as traffic information comprising traffic jams, weather, audios and videos; the data transmitting module of the navigation terminal uploads the collected data to the server; the server receives the data and computes and analyzes the traffic information of a current geographic position of the navigation terminal based on the data; and accordingly the server updates the traffic information in the database.

The mission affiliates comprise following four types of users: (1) the users who acknowledge familiarity with mission spots by marking out the familiar mission spots when registering the accounts thereof via the server, wherein the mission spots are geographic positions correspondent to the mission initiated by the server; (2) the users who have appeared within a certain range around the mission spots over a predefined frequency according to an analysis of GPS signals by the server; (3) the users who are currently appearing at the mission spots according to the analysis of GPS signals by the server; and (4) the users whose accounts have accomplished a certain number of missions and the users who accomplish the missions at a certain frequency.

By the above structure, the users and the system operator both participate in updating and examining the data, in such a manner that errors in the data submitted by the users are eliminated and accuracy of the database data is ensured.

These and other objectives, features, and advantages of the present invention will become apparent from the following detailed description, the accompanying drawings, and the appended claims.

DETAILED DESCRIPTION OF THE PREFERRED EMBODIMENT

Figure 1:
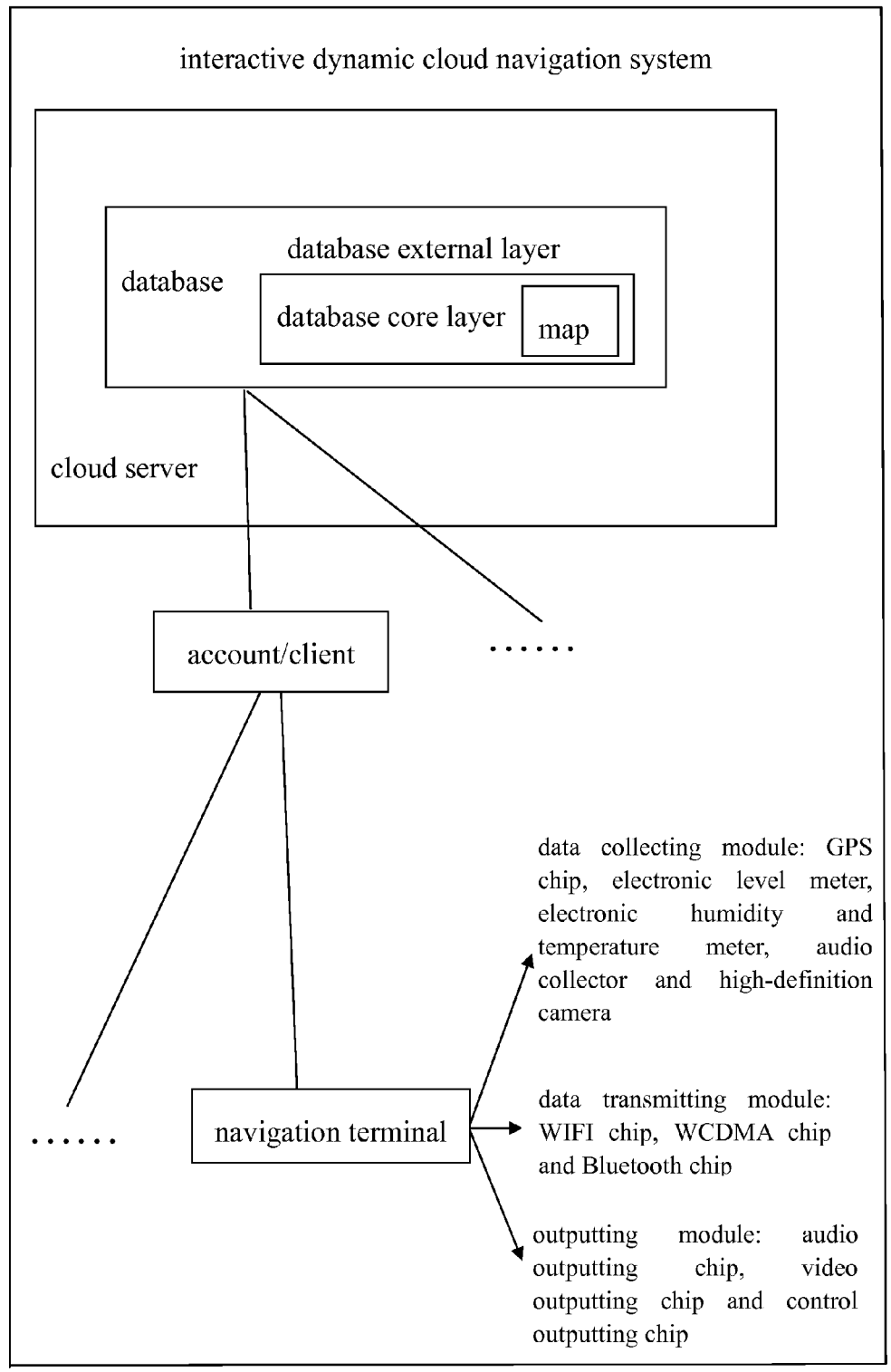
FIG. 1 is a block diagram of an interactive dynamic cloud navigation system according to a preferred embodiment of the present invention.

The present invention provides an interactive dynamic cloud navigation system comprising:

a server, comprising a database having a map; and a plurality of navigation terminals, wherein each navigation terminal comprises a data collecting and storing module, a data transmitting module and an outputting module, wherein the data collecting and storing module comprises a GPS chip; the data collecting and storing module is for collecting and storing data; the data transmitting module is for transmitting the data between the navigation terminal and the server; and the outputting module is for outputting the data stored in the navigation terminal; each navigation terminal corresponds to an account and the account can correspond to at least one navigation terminal; and the data comprise geographic positions of the navigation terminal and map data correspondent to the geographic positions;

wherein the server is for initiating a mission according to a request from at least one user; the navigation terminal logs in to the correspondent account, accepts the mission via the data transmitting module, responds to and executes the mission via the data collecting and storing module to generate the data and uploads the data to the server via the account, so as to finish the mission.

In the interactive dynamic cloud navigation system provided by the present invention, the users are able to directly submit the request of initiating the mission to the server; then the server assigns the mission to the other users to obtain the data, or the other users voluntarily respond to the mission to provide the data. Besides, when the users search the database for some data and find no matching results, the request of initiating the mission is automatically submitted to the server.

In the interactive dynamic cloud navigation system provided by the present invention, the navigation terminal is also for initiating the mission via the account and transmitting the mission to the server via the data transmitting module; the server responds to the mission, establishes a sub-mission and transmits the sub-mission to other accounts. Other navigation terminals log in to the other accounts, accept the sub-mission via the respective data transmitting modules, respond to and execute the sub-mission via the data collecting and storing module to generate sub-data and upload the sub-data to the server via the other accounts, so as to finish the sub-mission.

Preferably, the interactive dynamic cloud navigation system further comprises associate terminals for logging in to the accounts by the users to submit the data directly; the server examines the submitted data via computing and analyzing, so as to update the database of the server.

Thus when the map data have an error and accordingly the users need to submit an application of correcting, the users are able to submit the application of correcting via the associate terminals which are independent of the plurality of navigation terminals. The associate terminals comprise PCs, smart phones, tablet PCs and other internet devices, so as to simplify and facilitate operation and reduce a cost of the navigation terminals.

When the account submits the data directly, the server gives credits to the account; when the navigation terminal uploads the data voluntarily or for finishing the mission or the sub-mission, the server gives credits to the account correspondent to the navigation terminal.

Preferably, the credits of the account are for trading with a system operator; in other words, the user who owns a large quantity of credits under the correspondent account can change the credits under the account into cash, while the user who owns no credits under the correspondent account but needs to initiate the mission can purchase the credits from the system operator.

Referring to FIG. 1, according to a preferred embodiment of the present invention, an interactive dynamic cloud navigation system comprises a cloud server, a plurality of navigation terminals and a plurality of associate terminals, wherein the cloud server has a database. The database comprises a database external layer and a database core layer; the database core layer has a map. The navigation terminal comprises a data collecting module, a data transmitting module and an outputting module, wherein the data collecting module comprises a GPS chip, an electronic level meter, an electronic humidity and temperature meter, an audio collector and a high-definition camera; the data transmitting module comprises a WIFI chip, a WCDMA chip and a Bluetooth chip; the outputting module comprises an audio outputting chip, a video outputting chip and a control outputting chip. A user is connected to the cloud server by at least one of following three manners: (1) by logging in to an account correspondent to the user via the navigation terminal; (2) by logging in to an account correspondent to the user via the associate terminal; (3) by a client on the associate terminal, wherein the plurality of the associate terminals comprise cell phones, PC, tablet PCs and other mobile devices and the Bluetooth chip is for connecting the navigation terminal to the associate terminal.

Figure 2:
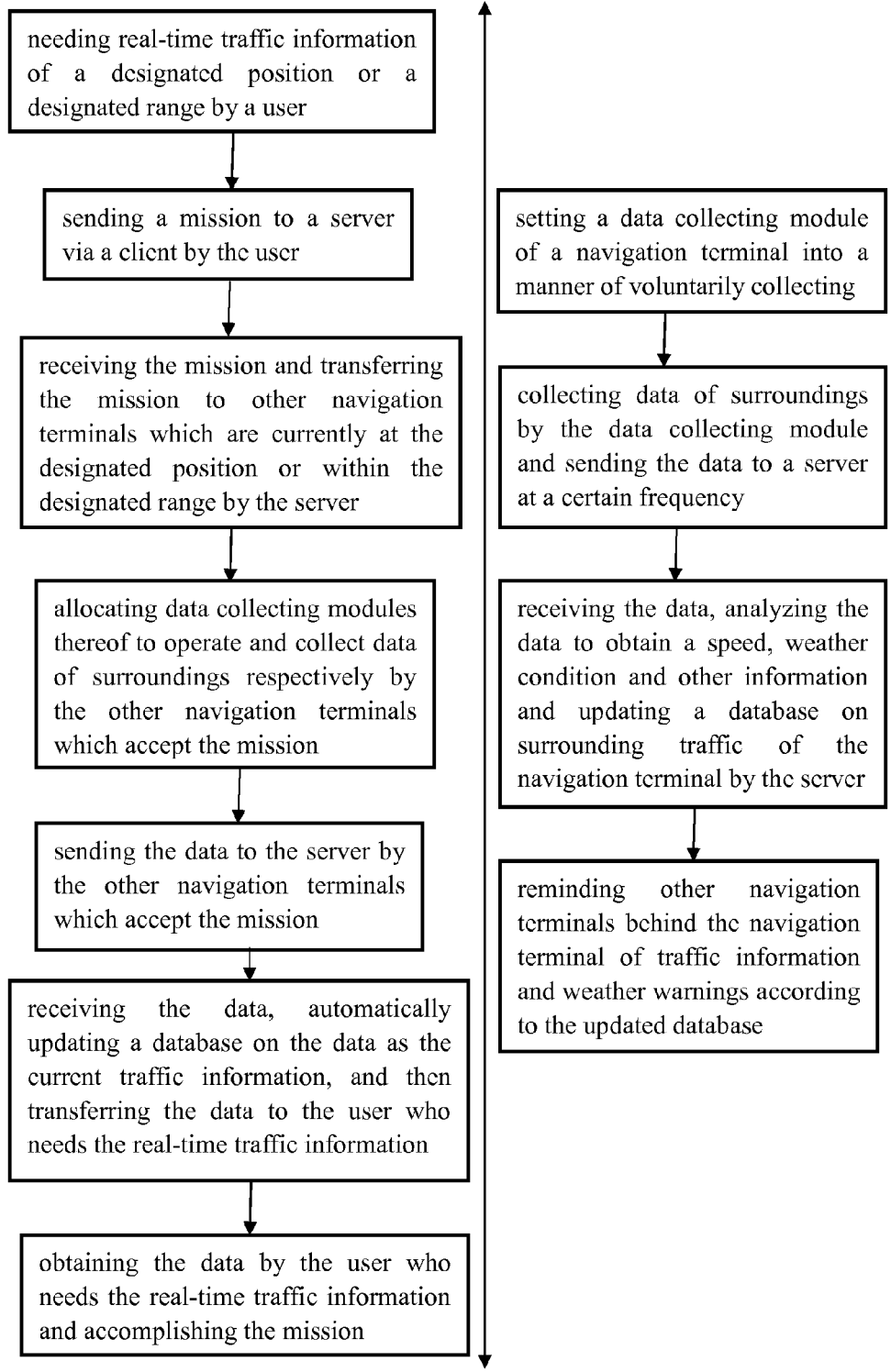
FIG. 2 is a flow chart of collecting data by the interactive dynamic cloud navigation system according to the preferred embodiment of the present invention, comprising automatically collecting and passively collecting.

According to the preferred embodiment of the present invention, the interactive dynamic cloud navigation system collects data via following two manners, voluntarily collecting and passively collecting. As showed in FIG. 2, the manner of passively collecting comprises steps of: (1) needing real-time traffic information of a designated position or a designated range by a user; (2) sending a mission to the server via the client by the user; (3) receiving the mission and transferring the mission to other navigation terminals which are currently at the designated position or within the designated range by the server; (4) allocating the data collecting modules to operate and collect data of surroundings respectively by the other navigation terminals which accept the mission; (5) sending the data to the server by the other navigation terminals which accept the mission; (6) receiving the data, automatically updating the database on the data as the current traffic information, and then transferring the data to the user who needs the real-time traffic information; and (7) obtaining the data by the user who needs the real-time traffic information and accomplishing the mission. As showed in FIG. 2, the manner of voluntarily collecting comprises steps of: (1) setting the data collecting module of a navigation terminal into the manner of voluntarily collecting; (2) collecting data of surroundings by the data collecting module and sending the data to the server at a certain frequency; (3) receiving the data, analyzing the data to obtain a speed, weather condition and other information and updating the database on surrounding traffic of the navigation terminal by the server; and (4) reminding other navigation terminals behind the navigation terminal of traffic information and weather warnings according to the updated database.

Figure 3:
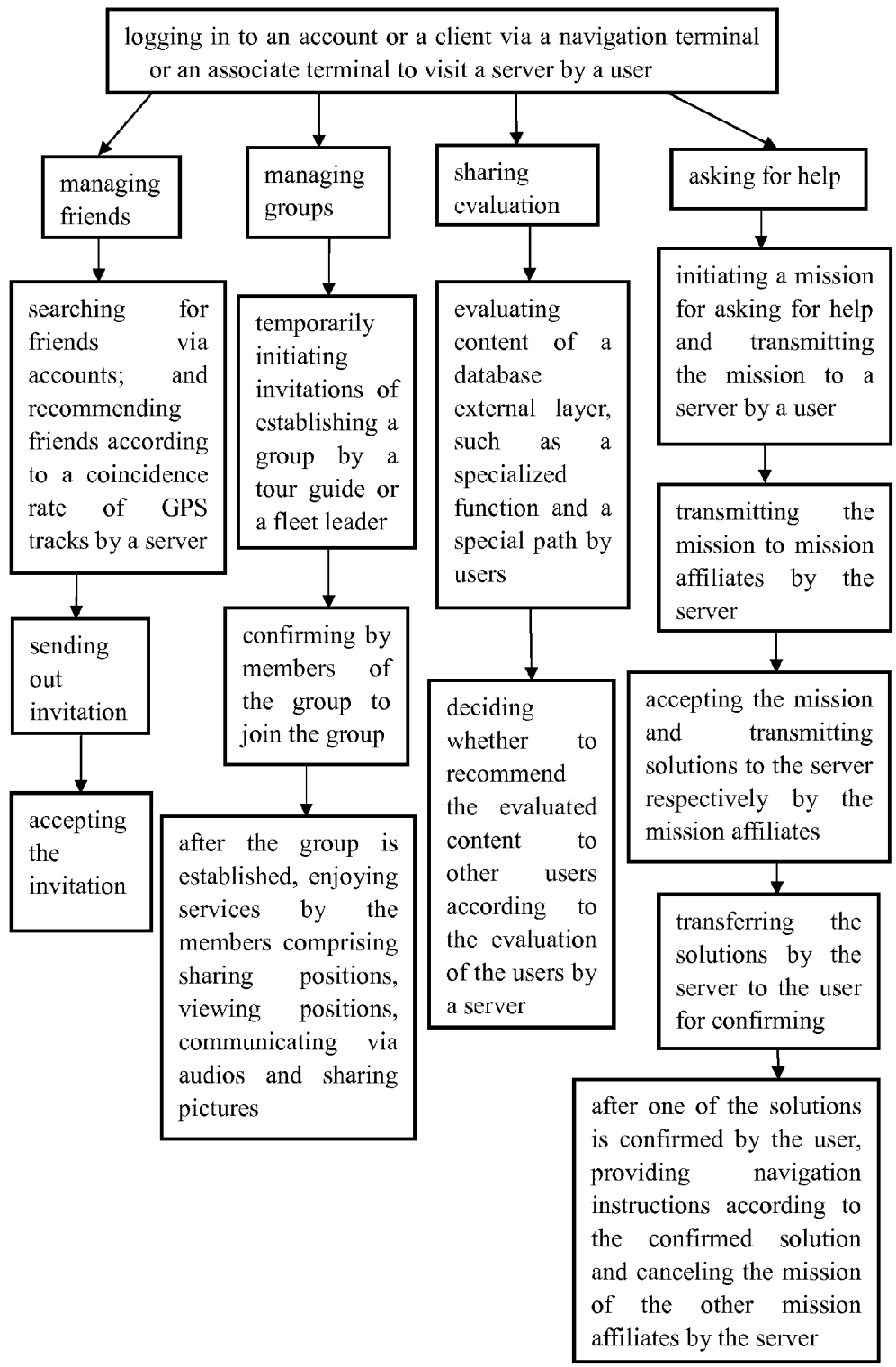
FIG. 3 is a flow chart of data management and data sharing of an external layer of database according to the preferred embodiment of the present invention.
Figure 4:
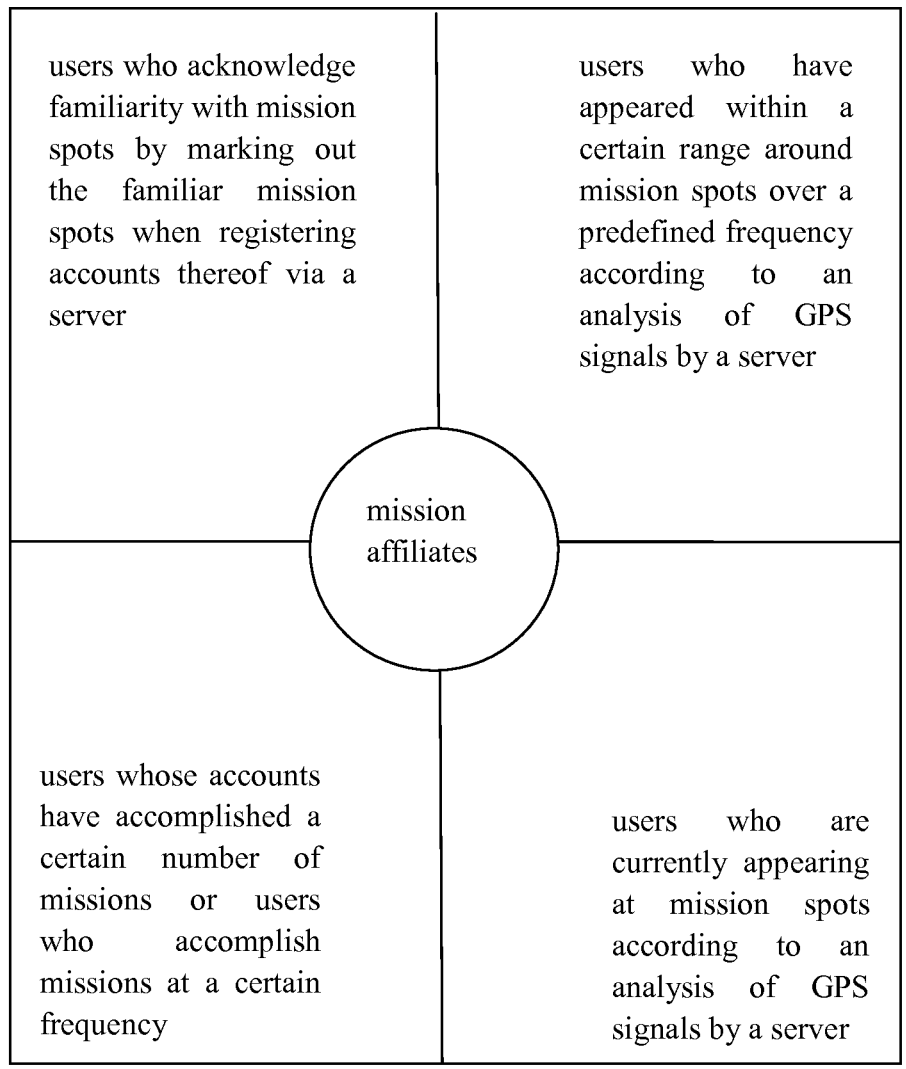
FIG. 4 is a sketch view of mission affiliates according to the preferred embodiment of the present invention.

According to the preferred embodiment of the present invention, FIG. 3 is a flow chart of managing and sharing the data of the database external layer, wherein the users log in to the accounts or the clients to visit the server via the navigation terminals or the associate terminals, so as to manage friends, manage groups, share evaluation and ask for help. As showed in FIG. 3, a process of asking for help comprises steps of: (1) initiating a mission for asking for help and transmitting the mission to the server by a user; (2) transmitting the mission to mission affiliates by the server; (3) accepting the mission and transmitting solutions to the server respectively by the mission affiliates; (4) transferring the solutions by the server to the user for confirming; and (5) after one of the solutions is confirmed by the user, providing navigation instructions according to the confirmed solution and canceling the mission of the other mission affiliates by the server. As showed in FIG. 4, the mission affiliates comprise following four types of users: (1) the users who acknowledge familiarity with mission spots by marking out the familiar mission spots when registering the accounts thereof via the server, wherein the mission spots are geographic positions correspondent to the mission initiated by the server; (2) the users who have appeared within a certain range around the mission spots over a predefined frequency according to an analysis of GPS signals by the server; (3) the users who are currently appearing at the mission spots according to the analysis of GPS signals by the server; and (4) the users whose accounts have accomplished a certain number of missions or the users who accomplish the missions at a certain frequency. As showed in FIG. 3, a process of managing groups comprises steps of: (1) temporarily initiating invitations of establishing a group by a tour guide or a fleet leader; (2) confirming by members of the group to join the group; and (3) after the group is established, enjoying services by the members, comprising sharing positions, viewing positions, communicating via audios and sharing pictures.

Figure 5:
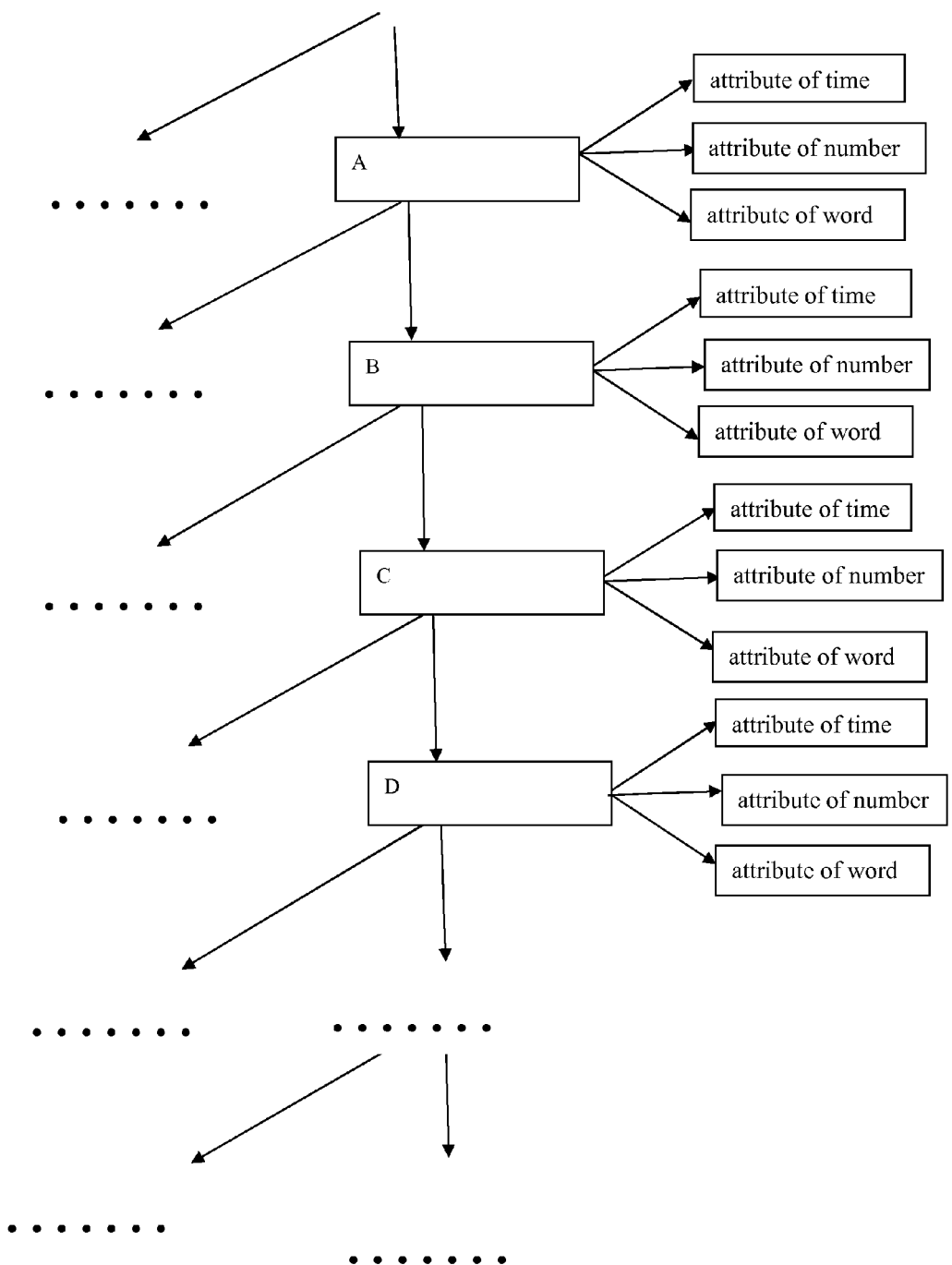
FIG. 5 is a sketch view of a tree-shaped topology of the database according to the preferred embodiment of the present invention.

According to the preferred embodiment of the present invention, a data storage structure of the database is a tree-shaped topology. A set of data comprise business D of company C at building B on street A, wherein the street A comprises the building B and other buildings; the building B comprises the company C and other companies; and the company C comprises the business D and other businesses. As showed in FIG. 5, the server successively stores the set of data according to the tree-shaped topology, in such a manner that, by searching for business D company C building B street A, multiple factors therein are provided to target a navigation destination; by only searching for business D, the navigation destination is also targeted, so as to greatly improve a diversity of searching approaches, wherein the users are able to freely add data points or data strings; and several types of appendant features, comprising but not limited to word, time and number, are freely added via each data point. The tree-shaped topology has following advantages: (1) a further downward extension of the data and functions of the map is accomplished via the topology, wherein information comprising weather, price, date, period of validity and note is marked on the map; (2) the users are able to mark each appendage with attributes comprising time, number, price and word, so as to facilitate searching and precisely lock the target; and (3) the users are able to precisely lock a certain range around the target by searching for any member or members selected from a group consisting of A, B, C and D.

Figure 6:
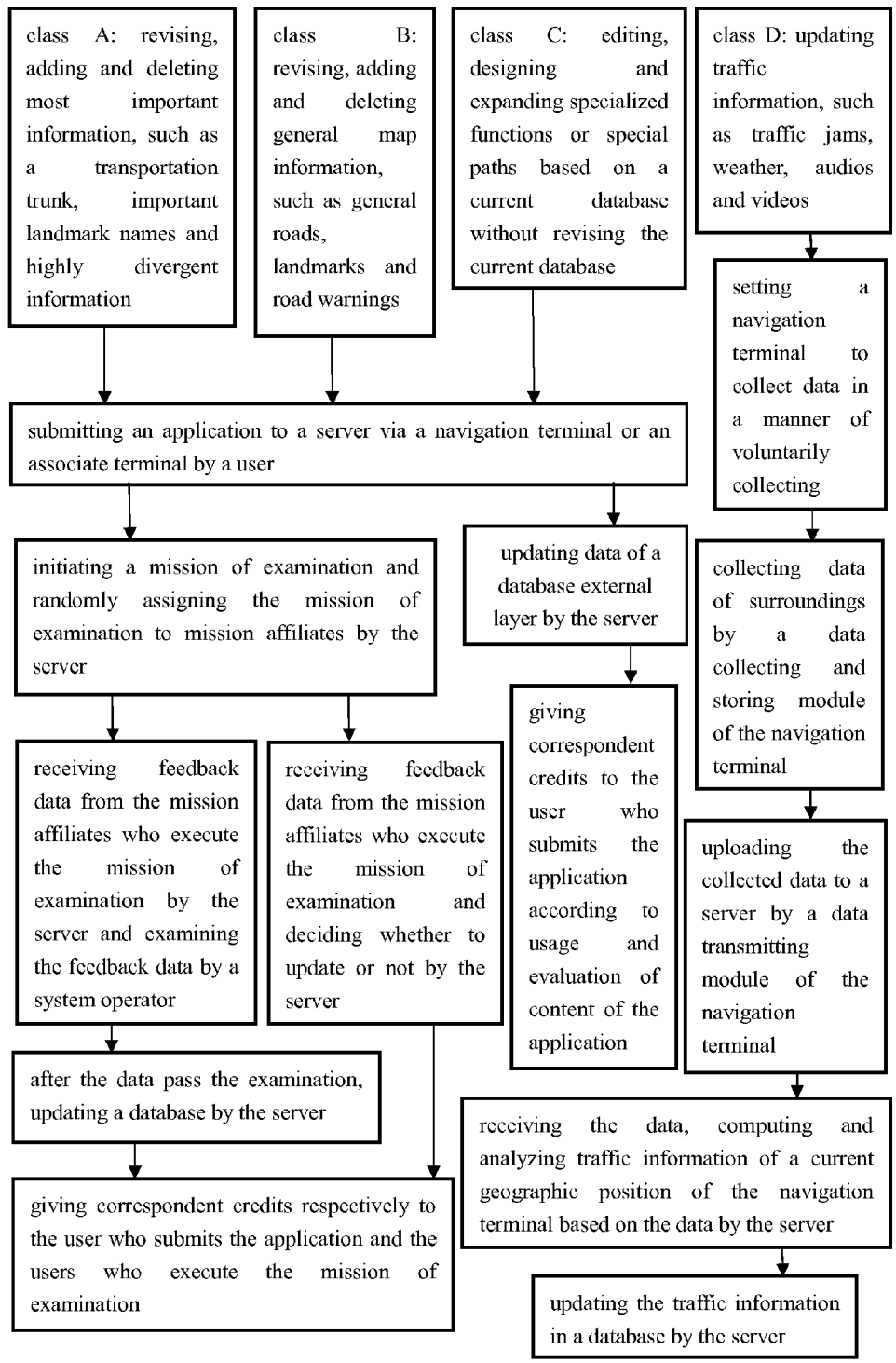
FIG. 6 is a flow chart of updating the database by the server according to the preferred embodiment of the present invention.

As showed in FIG. 6, updating the database by the server comprises four gradually lowered classes of updating, wherein class A as the highest class is for revising, adding and deleting most important information, such as a transportation trunk, important landmark names and highly divergent information; next, class B is for revising, adding and deleting general map information, such as general roads, general landmarks and road warnings; then, class C is for editing, designing and expanding specialized functions or special paths based on the current database without revising the current database; and class D as the lowest class is for updating traffic information comprising traffic jams, weather, audios and videos. A process of the class A comprises steps of: (1) submitting an application to the server via the navigation terminal or the associate terminal by the user; (2) initiating a mission of examination and randomly assigning the mission of examination to mission affiliates by the server; (3) receiving feedback data from the mission affiliates who execute the mission of examination by the server and examining the feedback data by the system operator; (4) after the data pass the examination, updating the database by the server; and (5) giving correspondent credits respectively to the user who submits the application and the users who execute the mission of examination. A process of class B comprises steps of: (1) submitting an application to the server via the navigation terminal or the associate terminal by the user; (2) initiating a mission of examination and randomly assigning the mission of examination to mission affiliates by the server; (3) receiving feedback data from the mission affiliates who execute the mission of examination and deciding whether to update or not by the server; and (4) giving correspondent credits respectively to the user who submits the application and the users who execute the mission of examination. A process of the class C comprises steps of: (1) submitting an application to the server via the navigation terminal or the associate terminal by the user; (2) updating the data of the database external layer by the server; and (3) giving correspondent credits to the user who submits the application according to usage and evaluation of content of the application. A process of the class D comprises steps of: (1) setting the navigation terminal to collect data in a manner of voluntarily collecting; (2) collecting data of surroundings by the data collecting and storing module of the navigation terminal; (3) uploading the collected data to the server by the data transmitting module of the navigation terminal; (4) receiving the data, computing and analyzing traffic information of a current geographic position of the navigation terminal based on the data by the server; and (5) updating the traffic information in the database by the server.

Figure 7:
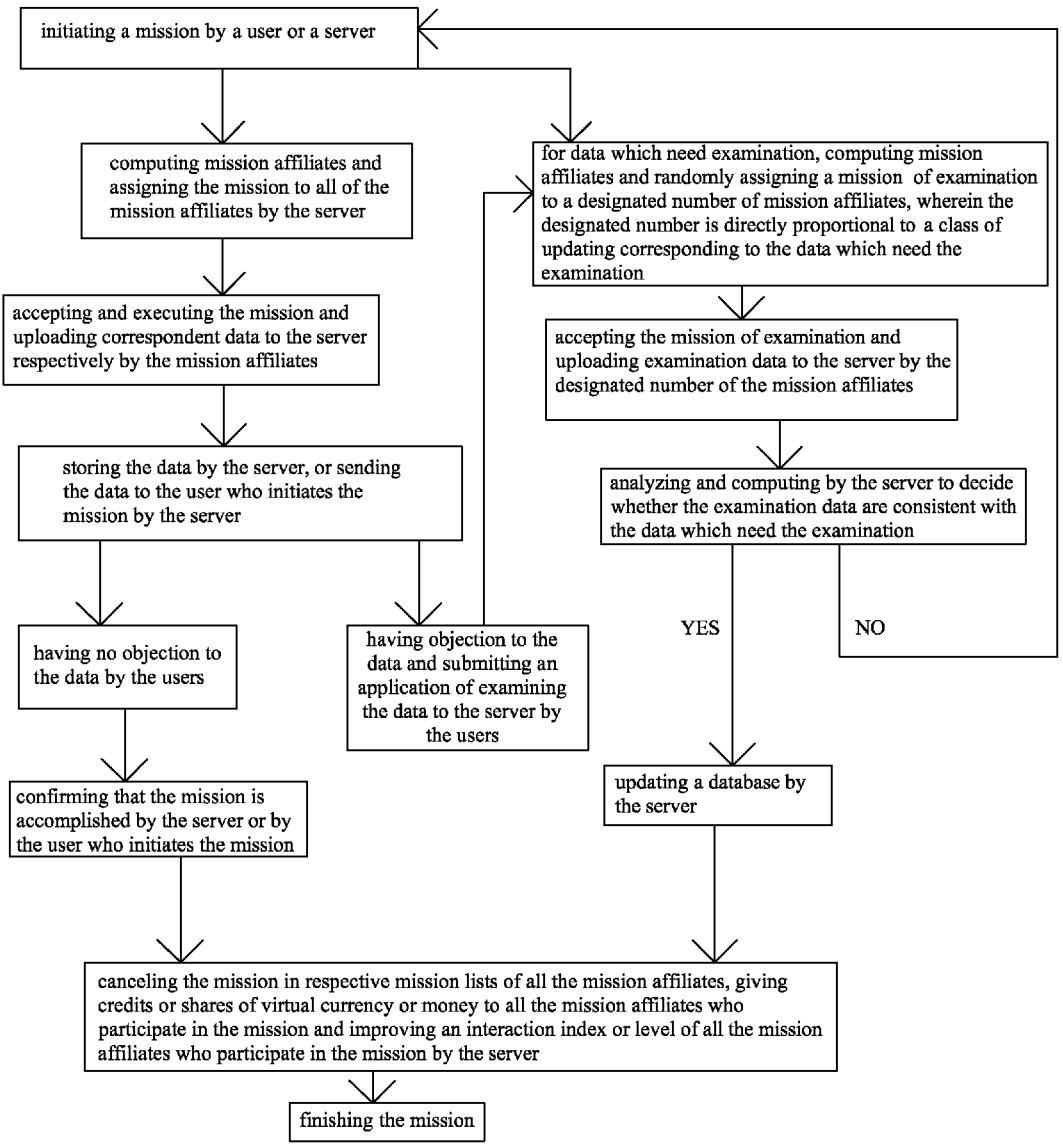
FIG. 7 is a flow chart of finishing a mission by the interactive dynamic cloud navigation system according to the preferred embodiment of the present invention.

As showed in FIG. 7, a process of accomplishing a mission by the interactive dynamic cloud navigation system comprises steps of: initiating a mission by the user or the server; computing mission affiliates and assigning the mission to all of the mission affiliates by the server; accepting and executing the mission and uploading correspondent data to the server respectively by the mission affiliates; storing the data by the server, or sending the data to the user who initiates the mission by the server; if the users have no objection to the data, confirming that the mission is accomplished by the server or by the user who initiates the mission; canceling the mission in respective mission lists of all the mission affiliates, giving credits or shares of virtual currency or money to all the mission affiliates who participate in the mission and improving an interaction index or level of all the mission affiliates who participate in the mission by the server; and finishing the mission.

After the step of "initiating a mission by the use or the server" and before the step of "canceling the mission in respective mission lists of all the mission affiliates, giving credits or shares of virtual currency or money to all the mission affiliates who participate in the mission and improving an interaction index or level of all the mission affiliates who participate in the mission by the server", the process of accomplishing a mission by the interactive dynamic cloud navigation system also comprises steps of: for data which need examination, computing mission affiliates and randomly assigning a mission of examination to a designated number of mission affiliates, wherein the designated number is directly proportional to the class of updating corresponding to the data which need the examination; accepting the mission of examination and uploading examination data to the server by the designated number of the mission affiliates; analyzing and computing by the server to decide whether the examination data are consistent with the data which need the examination; if yes, updating the database by the server; if no, returning to the step of "initiating a mission by the use or the server".

After the step of "storing the data by the server, or sending the data to the user who initiates the mission by the server", the process of accomplishing a mission by the interactive dynamic cloud navigation system further comprises steps of: if the users have objection to the data, submitting an application of examining the data to the server by the users; and going to the step of "for the data which need examination, computing mission affiliates and randomly assigning a mission of examination to a designated number of mission affiliates, wherein the designated number is directly proportional to the class of updating corresponding to the data which need the examination".

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An interactive dynamic cloud navigation system, comprising:
a server, comprising a database having a map; and
a plurality of navigation terminals, wherein each said navigation terminal comprises a data collecting and storing module, a data transmitting module and an outputting module, wherein said data collecting and storing module comprise a GPS chip; said data collecting and storing module is for collecting and storing data; said data transmitting module is for transmitting said data between said navigation terminal and said server; said outputting terminal is for outputting said data stored in said navigation terminal; and said data comprise geographic positions of said navigation terminal and map data correspondent to said geographic positions;
wherein said navigation terminal is for logging in a correspondent account, initiating a mission at a designated position or within a designated range via said correspondent account and transmitting said mission to said server via said data transmitting module; said server is for responding to said mission, establishing a sub-mission and transmitting said sub-mission to other accounts; other navigation terminals log in to said other accounts correspondent to said other navigation terminals, accept said sub-mission via said data transmitting modules, respond to said sub-mission via said data collecting and storing modules, and execute said sub-mission to generate data and upload said data to said server via said other accounts, in such a manner that said sub-mission is accomplished; and further, said server is also for computing mission affiliates, after establishing said sub-mission, and randomly assigning said sub-mission to said accounts correspondent to said mission affiliates, wherein said mission affiliates comprise at least one type of users selected from a group consisting of following four types of users: (1) said users who acknowledge familiarity with mission spots by marking out said familiar mission spots when registering said accounts thereof via the server, wherein said mission spots are geographic positions correspondent to said sub-mission; (2) said users who have appeared within a certain range around said mission spots over a predefined frequency according to an analysis of GPS signals by said server; (3) said users who are currently appearing at said mission spots according to said analysis of GPS signals by said server; and (4) said users whose accounts have accomplished a certain number of missions or said users whose accounts accomplish said missions at a certain frequency; then said mission affiliates log in said accounts correspondent to said mission affiliates, accept said sub-mission via said data transmitting modules, respond to said sub-mission via said data collecting and storing modules, and execute said sub-mission to generate data and upload said data to said server via said accounts correspondent to said mission affiliates, in such a manner that said sub-mission is accomplished; and wherein said server gives credits to said other accounts correspondent to said other navigation terminals who upload said data to said server; said server gives credits to said account correspondent to said navigation terminal who initiates said mission, or said account correspondent to said navigation terminal who initiates said mission consumes said credits.

2. The interactive dynamic cloud navigation system, as recited in claim 1, wherein said mission is initiated by a user correspondent to said account via said navigation terminal which initiates said mission; said server is further for sending said data uploaded by said mission affiliates to said navigation terminal which initiates said mission, wherein said data are provided for said user who initiates said mission to confirm.

3. The interactive dynamic cloud navigation system, as recited in claim 1, wherein said server is further for updating said database on said data uploaded by said mission affiliates.

4. The interactive dynamic cloud navigation system, as recited in claim 3, wherein when updating said database, said server divides data of said database into a plurality of classes according to different importance of said data of said database.

5. The interactive dynamic cloud navigation system, as recited in claim 4, wherein a designated number of said mission affiliates are randomly assigned with said sub-mission by said server, and said designated number is directly proportional to said class of said data correspondent to said sub-mission.

6. The interactive dynamic cloud navigation system, as recited in claim 1, wherein said database has a database external layer for updating application data which are uploaded by said user via said navigation terminal, wherein said application data comprise specialized functions or special paths which are edited, designed and expanded based on said database without revising said database.

7. The interactive dynamic cloud navigation system, as recited in claim 6, wherein said server gives credits to an account correspondent to said navigation terminal which uploads said application data, after said application data are used or evaluated.

8. The interactive dynamic cloud navigation system, as recited in claim 1, further comprising a plurality of associate terminals connected to said server, for logging in to said accounts to directly submit said data to said server or directly initiate said mission.

9. The interactive dynamic cloud navigation system, as recited in claim 8, wherein said server stores said data submitted to said server; a data storage structure of said data submitted to said server is a tree-shaped topology having a plurality of data points or data strings, wherein each said data point comprises several types of appendant features, comprising word, time and number, in such a manner that said data point or said data string is added by said user.

10. The interactive dynamic cloud navigation system, as recited in claim 1, wherein said navigation terminal is further for establishing groups for said users to share said geographical positions, view geographical positions, communicate via audios and share pictures.

\* \* \* \* \*